United States Patent [19]

Bergevin

[11] Patent Number: 5,586,408
[45] Date of Patent: *Dec. 24, 1996

[54] SURFACE FOR SPORTS AND OTHER USES

[75] Inventor: Jerry G. Bergevin, Lynnwood, Wash.

[73] Assignee: Turf Systems International, Inc., Lynnwood, Wash.

[ * ] Notice: The term of this patent shall not extend beyond the expiration date of Pat. No. 5,489,317.

[21] Appl. No.: 334,414

[22] Filed: Nov. 4, 1994

Related U.S. Application Data

[63] Continuation of Ser. No. 78,624, Jun. 17, 1993, abandoned, which is a continuation-in-part of Ser. No. 902,147, Jun. 22, 1992, abandoned.

[51] Int. Cl.$^6$ ............................... A01G 1/00; A01H 5/00
[52] U.S. Cl. .................... 47/1.01; 47/58; 47/56; 800/DIG. 55
[58] Field of Search ................. 47/1.01, 58, 56; 800/DIG. 55

[56] References Cited

U.S. PATENT DOCUMENTS

| 3,446,122 | 5/1969 | Raichle et al. | 94/7 |
|---|---|---|---|
| 3,703,786 | 11/1972 | Swan | 47/56 |
| 4,007,556 | 2/1977 | Gluck | 47/56 |
| 4,023,506 | 5/1977 | Robey | 111/1 |
| 4,073,753 | 2/1978 | Hauge | 260/2.3 |
| 4,318,248 | 3/1982 | Muldner | 47/56 |
| 4,462,184 | 7/1984 | Cunningham | 47/58 |
| 4,501,420 | 2/1985 | Dury | 272/3 |
| 4,572,700 | 2/1986 | Mantarro et al. | 404/35 |
| 4,852,870 | 8/1989 | Hawkins et al. | 272/3 |
| 5,014,462 | 5/1991 | Malmgren et al. | 47/1.01 |

FOREIGN PATENT DOCUMENTS

| 0174755 | 3/1986 | European Pat. Off. . |
|---|---|---|
| 0261769A1 | 3/1988 | European Pat. Off. . |
| 263566A1 | 4/1988 | European Pat. Off. . |
| 2225240 | 5/1990 | United Kingdom . |

OTHER PUBLICATIONS

"Brabauts Dagblad" (newspaper), Jul. 14, 1992, Holland.
"The 'Envelope' Base System," Safety Play Systems Inc., Victoria, B.C. (5 pages).
"Netlon Advanced Turf–Where Turf Alone Would Fail," Netlon, Blackburn, England (7 pages).
"Keep Off–Your Feet Are Killing Me!," Notts Sport News, Golf Edition, Victoria, B.C. (2 pages).
"Children at Play–The Next Four Years," Notts Sport News, Childsplay Edition (2 pages).
"Notts Sport Grass Reinforcement Passes Tough Scottish Trials," Notts Sport News, Grass Reinforcement Edition, Spring, 1990 (2 pages).
"Netlon Advanced Turf–Rootzone Technology–Stronger by Nature," Netlon, Blackburn, England, Jan., 1992.
"The Tried and Tested Sand–Filled Artificial Turf," DLW Sportfloor, date unknown.
"Sand–Filled Artificial Turf—We Take Nature as our Model," DLW Sportfloor, date unknown.

Primary Examiner—David T. Fox
Assistant Examiner—Elizabeth F. McElwain
Attorney, Agent, or Firm—Christensen O'Connor Johnson & Kindness PLLC

[57] ABSTRACT

An improved surface includes a synthetic turf base positioned atop a foundation. The synthetic turf base includes imitation grass blades secured to a backing. The synthetic turf base also includes a surface layer of material supported by the backing and intermixed with the imitation grass blades. Natural grass is planted in the surface layer of material wherein the natural grass includes natural grass blades and roots. The backing is provided with perforations or openings sufficient in number to permit the roots of the natural grass to extend through the backing into the sub-base of the foundation. The natural grass improves the overall desirability of the surface by improving its durability, increasing its life span, reducing the cost of installation, reducing the cost of maintenance, improving comfort for users, and improving the benefits to the ecology.

18 Claims, 7 Drawing Sheets

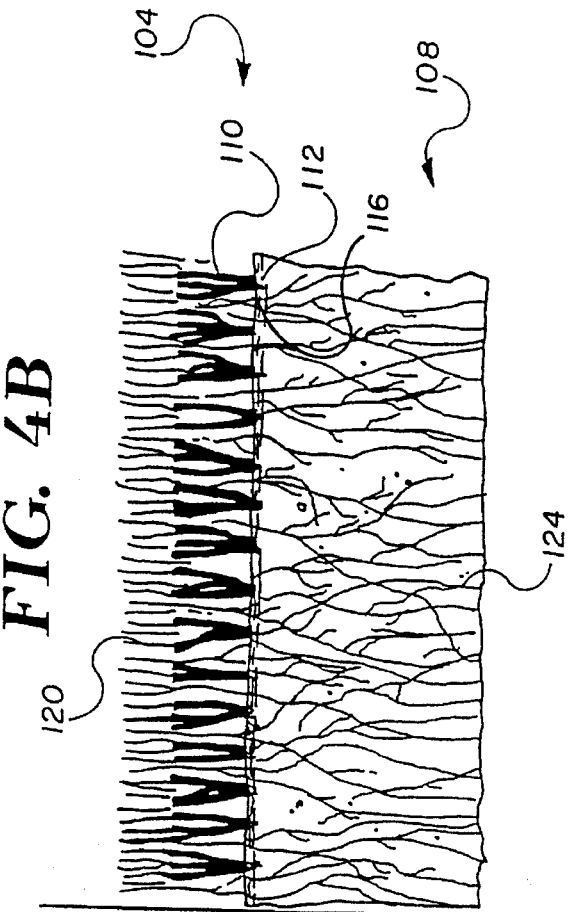

FIG. 4B

ONCE SECONDARY BACKING HAS
DECOMPOSED, GRASS ROOTS HAVE
BECOME ESTABLISHED.
TOTAL DECOMPOSITION OCCURS
WITHIN 2-3 WEEKS.
THIS PROVIDES ADEQUATE TIME
FOR GRASS ROOTS TO FULLY
PENETRATE PRIMARY BACKING.

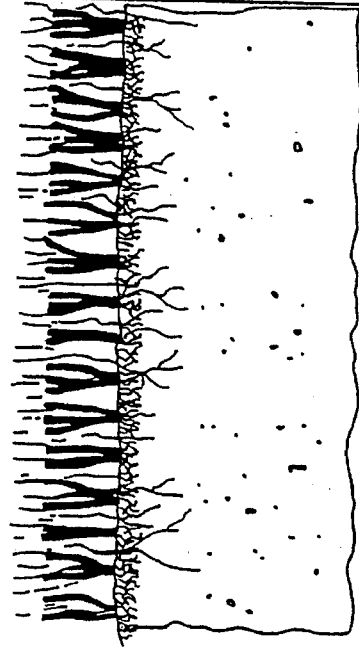

FIG. 4A

ATTACHMENT OF SYNTHETIC
GRASS BLADES TO THE PRIMARY
BACKING IS REINFORCED WITH
A BIODEGRADABLE SECONDARY
BACKING WITHIN 2 DAYS.
SUFFICIENT DECOMPOSITION OF
SECONDARY BACKING WILL OCCUR
TO ALLOW SUBSTANTIAL ROOT
AND WATER PENETRATION.

TYPICAL METHOD OF APPLICATION
(SHOWN USING OPTIONAL OVERLAPPING FABRIC)

SEEDED OR
SODDED PANELS

SURFACE FOR SPORTS AND OTHER USES

RELATED APPLICATIONS

This is a continuation of the prior application Ser. No. 08/078,624, filed Jun. 17, 1993 now abandoned, which in turn is a continuation-in-part of application Ser. No. 07/902,147, filed on Jun. 22, 1992 now abandoned, the benefit of the filing date of which are hereby claimed under 35 U.S.C. § 120.

TECHNICAL FIELD OF THE INVENTION

The present invention is directed toward an improved surface for sports and other uses and, more particularly, toward a combination artificial and natural surface and method of making the same.

BACKGROUND OF THE INVENTION

For years natural turf surfaces were used for most outdoor sports, for example, soccer, football, field hockey, cricket, rugby, etc. Natural turf surfaces are surfaces constructed with a grass grown in soil, or some other surface layer of material (e.g., sand and organic mixes, etc.), that is constructed upon a suitable foundation. A natural turf surface is generally preferred for its comfort, feel, grip, and appearance.

However, under heavy use and/or poor weather conditions, natural turf surfaces deteriorate rapidly and maintenance is costly. Intense activity on the turf destroys the grass and its root system, leaving mud and/or dirt as the playing surface. During this time, prior to re-establishment, the surface is often pockmarked, uneven, and possibly even hazardous to use.

Due to the needs of the sports programs, play usually continues until the sport's season is over, when the turf can be re-established. Further these natural turf surfaces are not usable during the re-establishment period because any use would defeat the re-establishment of the turf. The reestablishment period typically takes at least four months, or longer, under ideal weather conditions, during which the natural turf surface should not be used.

More recently, synthetic turf surfaces have been used as an alternative to natural turf surfaces. Synthetic turf surfaces generally come in two types, i.e., conventional and sand filled. Conventional synthetic turf is a dense synthetic material that takes the appearance of dense grass blades and is manually placed indoors or outdoors, usually upon an asphalt, concrete, wood, or other foundation. Sand-filled synthetic turf is a synthetic material similar to conventional synthetic turf, but with greater spacing between the blades, to accommodate a silica sand filling.

Both the conventional and sand-filled synthetic turf are placed indoors or outdoors, upon a foundation that may include an asphalt, concrete, wood or other supporting subsurface, and cushioning mats, water drainage and water irrigation.

Although synthetic turf surfaces are more durable, consistent, and easier to maintain than well-established natural turf surfaces, they are regarded as only moderately successful for sports and other uses for many reasons. The most notable of the disadvantages of the synthetic turf surfaces is the discomfort for sports use and increased number of injuries. Additionally, these surfaces are generally expensive to create and have a life expectancy averaging 8–15 years, if properly maintained. Still further, outdoor synthetic turf facilities remove large areas from the ecosystem, reducing natural processes including ground water recharge, oxygen and carbon monoxide balance, temperature modulation, and dust filtration. For these reasons, a number of synthetic turf surfaces are being convened back to the natural turf surfaces.

It is desirable, therefore, to provide an improved surface for sports and other uses, and a method of making the improved surface, wherein the surface will provide comfort and fewer injuries to the users, will be a durable surface under heavy use and in poor weather conditions, and will be less expensive to create and maintain than synthetic surfaces. Further, it is desirable to provide such a surface that will not remove large areas of the earth surface from the ecosystem.

SUMMARY OF THE INVENTION

The present invention provides an improved surface for sports fields and for other high traffic uses. The surface includes a foundation (base growing medium) and a sand-filled synthetic turf positioned atop the foundation. The sand-filled synthetic turf base includes grass blades attached (tufted, woven or other methods) to a permeable or perforated backing material similar to a carpet) with a layer of sand growing medium filled between the imitation grass blades. The imitation grass blades are constructed of a substantially flexible, synthetic material which are "split" longitudinally. The natural grass is planted in the sand filler growing medium so that the roots of the natural grass intertwine themselves through and around the splits in the imitation grass blades, securing them in position. The roots of the natural grass grown downward through the sand filler growing medium, through the permeations or perforations, voids, etc. in the synthetic turf backing material and into the foundation. The resultant surface is natural grass with the added durability and desirability of synthetic surface characteristics.

BRIEF DESCRIPTION OF THE DRAWINGS

FIGS. 4(a) and 4(b) are perspective views of an alternative backing of the artificial turf that is a portion of the improved surface of the subject invention;

DETAILED DESCRIPTION OF THE INVENTION

Figure 1A:
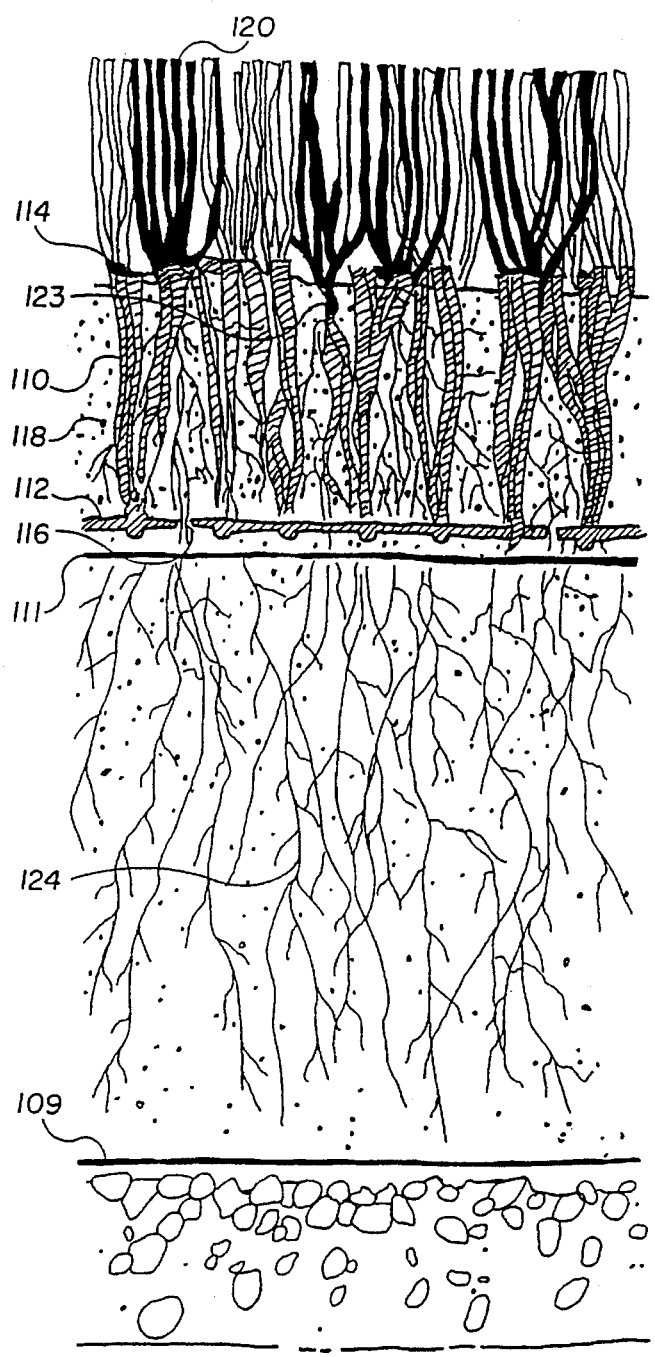
FIG. 1 is a partial sectional view of a first embodiment of the improved surface of the present invention.
Figure 1B:
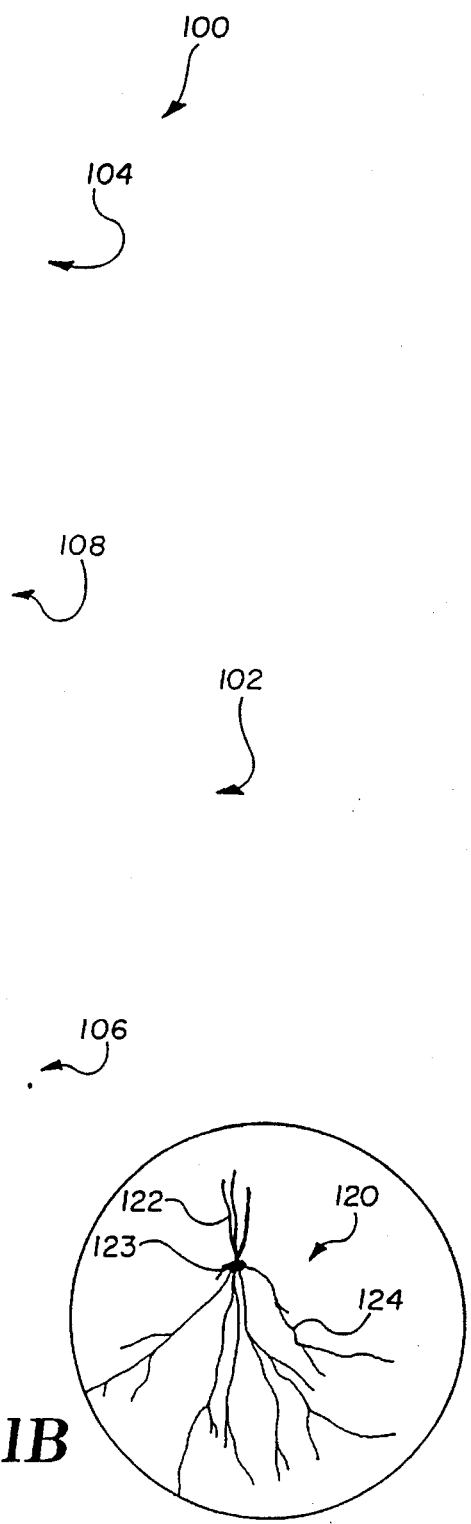

An improved surface 100 is illustrated in FIG. 1. The improved surface 100 includes a foundation 102 upon which is mounted a synthetic turf base 104. The foundation 102 is constructed of a subgrade 106 and a sub-base 108. The subgrade 106 is constructed for providing a structural base. The subgrade 106 may be formed of earth and rock existing on the site as is known in the art. Further, piping (not shown) may be placed in or on the sub-base 108 to provide drainage and/or irrigation to the sub-base 108. A subgrade for use with the invention may be readily provided by those skilled in the art.

The sub-base 108 is positioned atop the subgrade 106 and is constructed, among other things, to provide sufficient drainage of water from the improved surfacing 100 to the subgrade 106. The sub-base 108 is further constructed to provide structural support to the synthetic turf base 104 and a growing medium, as will be discussed more fully below. The sub-base 108 may be constructed of any combination of materials known to those skilled in the art such as, for example, sand, rubber, rock, and other organic and/or inorganic materials. Like the subgrade 106, the sub-base 108 may be readily constructed by those skilled in the art.

A first filter (optional) 109 is positioned intermediate the subgrade 106 and the sub-base 108 and a second filter (optional) 111 is positioned intermediate the synthetic turf base 104 and the sub-base 108. The first and second filters 109 and 111 may each comprise a fabric or other material constructed to permit the flow of water from the synthetic turf base 104 to the sub-base 108 and the subgrade 106, respectively. The first and second filters 109 and 111 are further constructed to substantially prevent the flow of other substances (such as mud and other contaminants) between the synthetic turf base 104, the sub-base 108, and the subgrade 106, i.e., to prevent such substances from moving downward or from migrating upward through the areas protected by the filters 109 and 111.

Adequate filters 109 and 111 may readily be selected by those skilled in the art. Also, it will be apparent to those skilled in the art that either the first or the second perforated filter 109 or 111, or both, may be eliminated in some applications without departing from the spirit of the present invention.

The present invention is intended, among other uses, for use as a sports playing field, in which case a sub-base 108 atop the subgrade 106 will most likely be desired to insure adequate support, and drainage to the improved surface 100. However, as will become apparent to those skilled in the art, the present invention is also suitable for use as other surfaces, such as, for example, fire access and parking medians, home yards, parks, and virtually anywhere that a natural or artificial turf surface is desired. In such applications, the subgrade 106 and sub-base 108 may be modified to suit the particular use to which the invention is being put. Further, in some applications, it may be desirable to eliminate the sub-base 108 altogether. However, it is generally desirable to provide some sub-base 108 (or alternatively, a modified subgrade 106) upon which the synthetic turf base 104 can be supported.

Figure 3A:
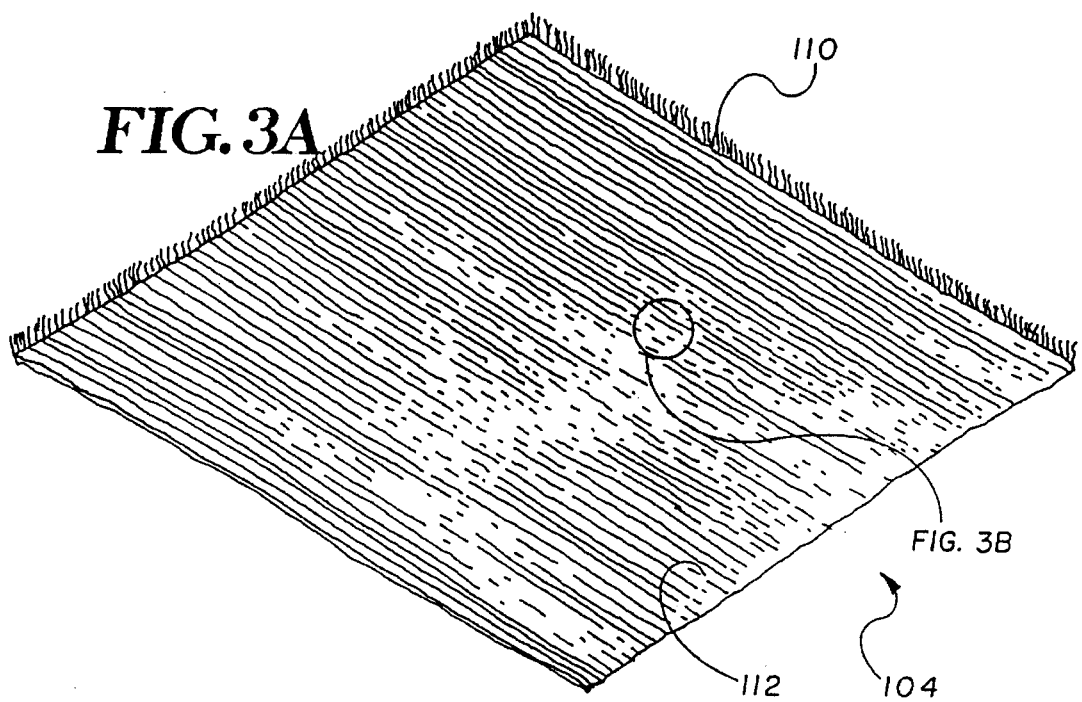
FIG. 3 is a perspective view of one kind of backing of the artificial turf that may be used as a portion of the improved surface of the subject invention.
Figure 3B:
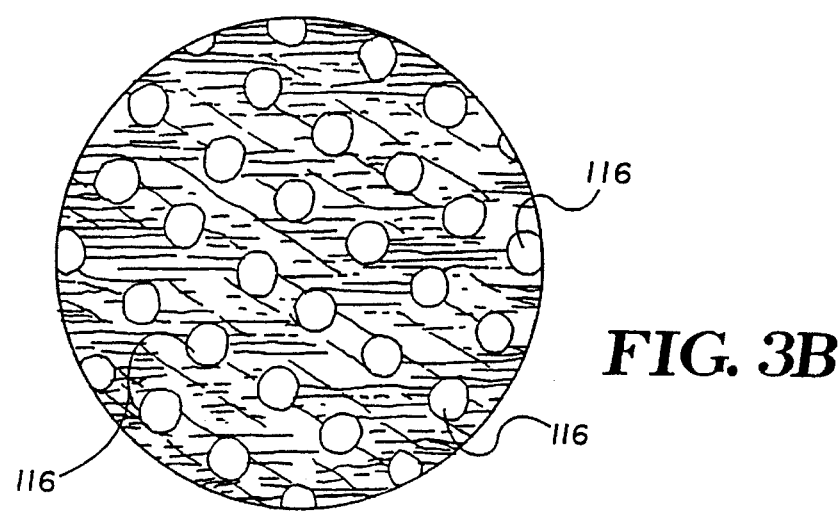

The synthetic turf base 104 includes a multiplicity of imitation grass blades 110 that are tufted, or otherwise secured, to a flexible backing 112. The imitation grass blades 110 are constructed of a synthetic material that is substantially flexible. The imitation grass blades 110 each extend from one side of the flexible backing 112 and are generally perpendicular to the flexible backing 112. The imitation grass blades 110 are of sufficient length that the top portions 114 are distant from the flexible backing 112. The flexible backing 112 includes a plurality of backing openings 116 (art example of a perforated backing is shown more clearly in FIG. 3, alternatively where the backing is an uncounted woven backing, it may be sufficiently course that the voids between the strands are sufficient openings) that permit water drainage therethrough to the foundation 102.

The synthetic turf base 104 may be readily constructed by those skilled in the art. Generally, synthetic turf constructions that are used with sand-filled synthetic turf surfaces are suited for use as the synthetic turf base 104 of the present invention. However, it is preferable that the number of openings be increased, that the size of the openings be increased, and that the density of the synthetic strands be decreased, for reasons that will become apparent from a further reading of this detailed description of the invention.

Figure 5B:
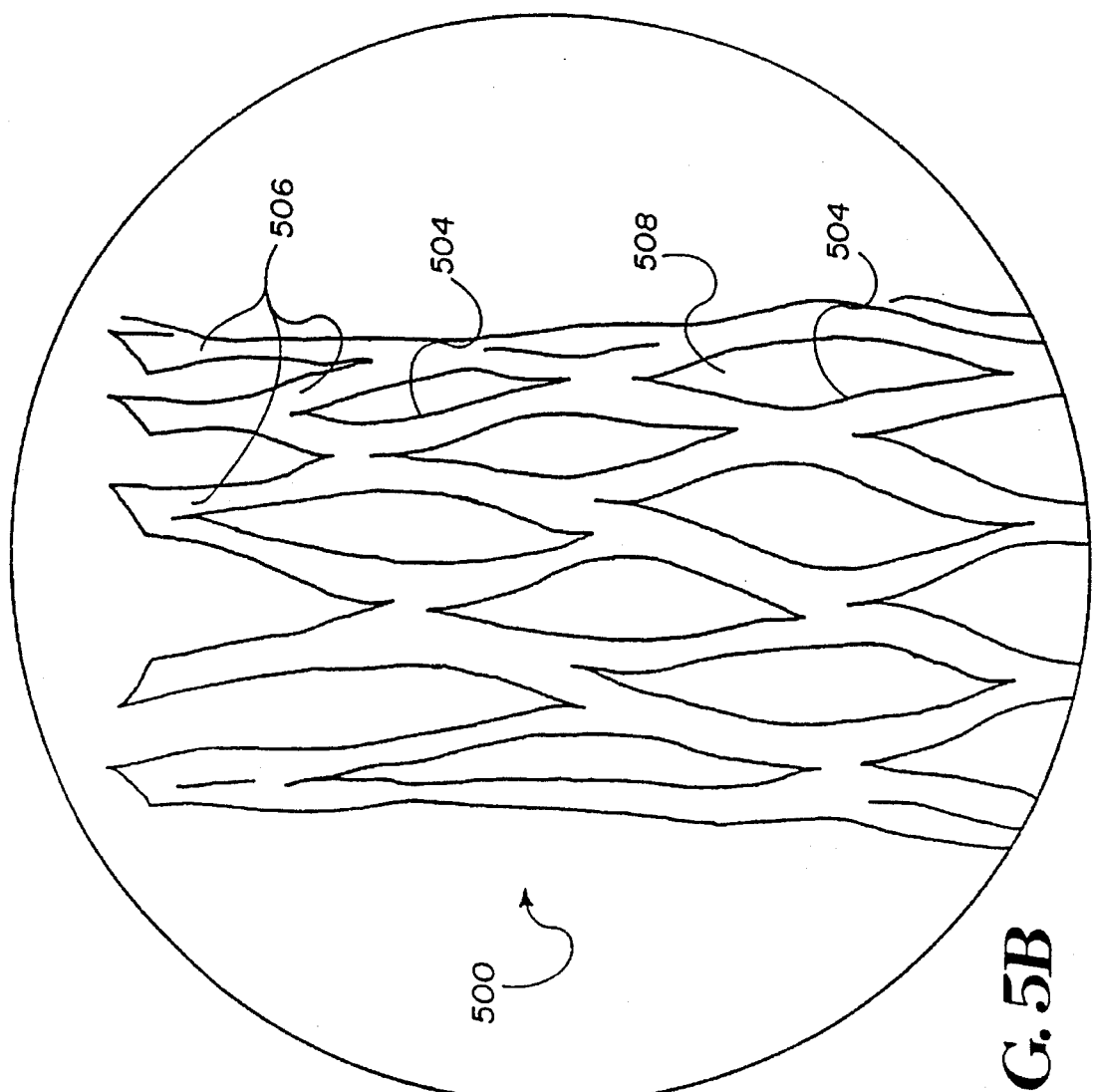
FIG. 5 is a more detailed illustration of a backing used in combination with the synthetic turf base of the subject invention.
Figure 5A:
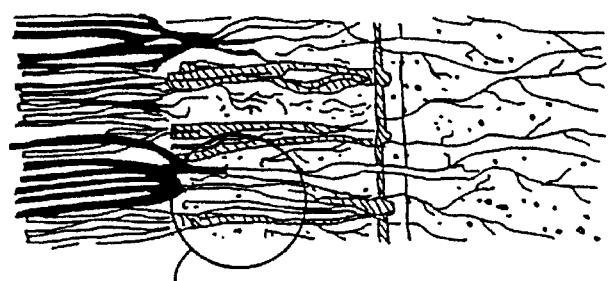

Preferably, the imitation grass blades 110 of the synthetic turf base 104 are partially slit, as illustrated in FIG. 5, or "fibrillated," i.e., include several openings throughout each imitation grass blade from the top portions 114 to the flexible backing 112. The blade openings in the imitation grass blades 110 and the backing openings 116 of the flexible backing assist in binding the resulting improved surface 100 together as will be described in more detail below.

The flexible backing 112 is provided for positioning the imitation grass blades 110 during installation and maintaining the imitation grass blades 110 in position during use of the improved surface 100. Further, the flexible backing 112 provides structural support to the improved surface 100 by distributing the force of impact upon the improved surface, thereby substantially preventing compaction of the sub-base 108.

In the presently preferred embodiment of the invention, the imitation grass blades 110 are tufted to a flexible backing 112 that is constructed from a primary backing (usually a woven fabric) and a secondary backing (usually a latex applied in hot liquid form that becomes solidified, flexible, and integrated with the primary backing when cooled). The primary backing is provided for receiving the imitation grass blades 110 to hold the imitation grass blades in relative position. The secondary backing is provided for structural support to the primary backing and to prevent the imitation grass blades 110 from being pulled out of position during handling and installation. In combination, the primary backing and the secondary backing cooperate to assist in positioning the imitation grass blades 110 in the desired position during installation and thereafter.

In one presently preferred embodiment of the invention, the primary backing is a mesh having the imitation grass blades 100 tufted thereto. The secondary backing is a biodegradable material selected to deteriorate after installation which the mesh will remain in place to hold the imitation grass blades 110 in position (see FIG. 4). As discussed above, the biodegradable material is also selected to provide structural support to the primary backing and to assist in holding the imitation grass blades 110 in position during installation. One example of biodegradable material for use in this application is urea formaldehyde resin, although those skilled in the art will appreciate that other biodegradable materials could be substituted therefore without departing from the true scope of the subject invention.

Both the primary backing and the secondary backing of the flexible backing 112 may be constructed from a variety of materials for positioning the imitation grass blades 110 and retaining the imitation grass blades 110 in the desired position. As one example, the imitation grass blades 110 may be tufted to a primary backing that is a mesh, and the secondary backing can be a latex material. As another example, instead of being tufted, the imitation grass blades 110 could be woven to a flexible backing 112 of woven material. Further, the imitation grass blades 110 could be tufted or woven, or otherwise fastened, to a mesh and retained by materials other than latex, for example, urea formaldehyde resin.

Those skilled in the art will appreciate that the primary backing and the secondary backing can be constructed in a variety of ways for positioning the imitation grass blades and retaining them in position during installation. As examples: a single ("primary") backing may be constructed of a hooked or velcro-like material so that the construction of the hooked single backing grips the imitation grass blades for positioning during installation; a single backing may be constructed from a conventional woven primary backing with some of the strands omitted; a single backing may be constructed of a material with openings ("fibrillations"); a single backing may be constructed, at least in part, of a biodegradable material. It is important, however, that the primary backing and the secondary backing of the flexible backing 112 be constructed from materials, and in a manner, so that openings are provided to the flexible backing 112, as will be described in more detail below.

Preferably, the imitation grass blades 110 are constructed to include a number of blade openings (splits or fibrillations), as will be described by reference to FIG. 5. Therein, an imitation grass blade 500 is constructed from a substantially flexible material, for example, polyolefin or polypropylene. However, the flexible material may be constructed from any material commonly used in the art for making imitation grass blades. The flexible material is preferably extruded, or formed using any other technique known in the art, to construct a mesh or web-like structure. So constructed, the flexible material comprises a plurality of strands of material 504 positioned and secured to create a web that defines a plurality of openings 508. Those skilled in the art will appreciate that the imitation grass blade illustrated in FIG. 5 is referred to in the an as a fibrillated grass blade. The fibrillated imitation grass blade 500 is preferred to further integrate the improved surface 100, as will be described in more detail below.

Presently, the invention is contemplated using imitation grass blades that are 28 millimeters in length and that have a density of 15 imitation grass blades per 10 centimeters for certain applications or uses. However, longer or shorter blades could be used with greater or lesser density depending on the contemplated use and site conditions. As an example, one alternative embodiment that is presently contemplated uses imitation grass blades that are 33 millimeters in length and have a density, of 13 imitation grass blades per 10 centimeters and another uses imitation grass blades that are 15 millimeters in length and have a density of 8–10 imitation grass blades per 10 centimeters.

Figure 6:
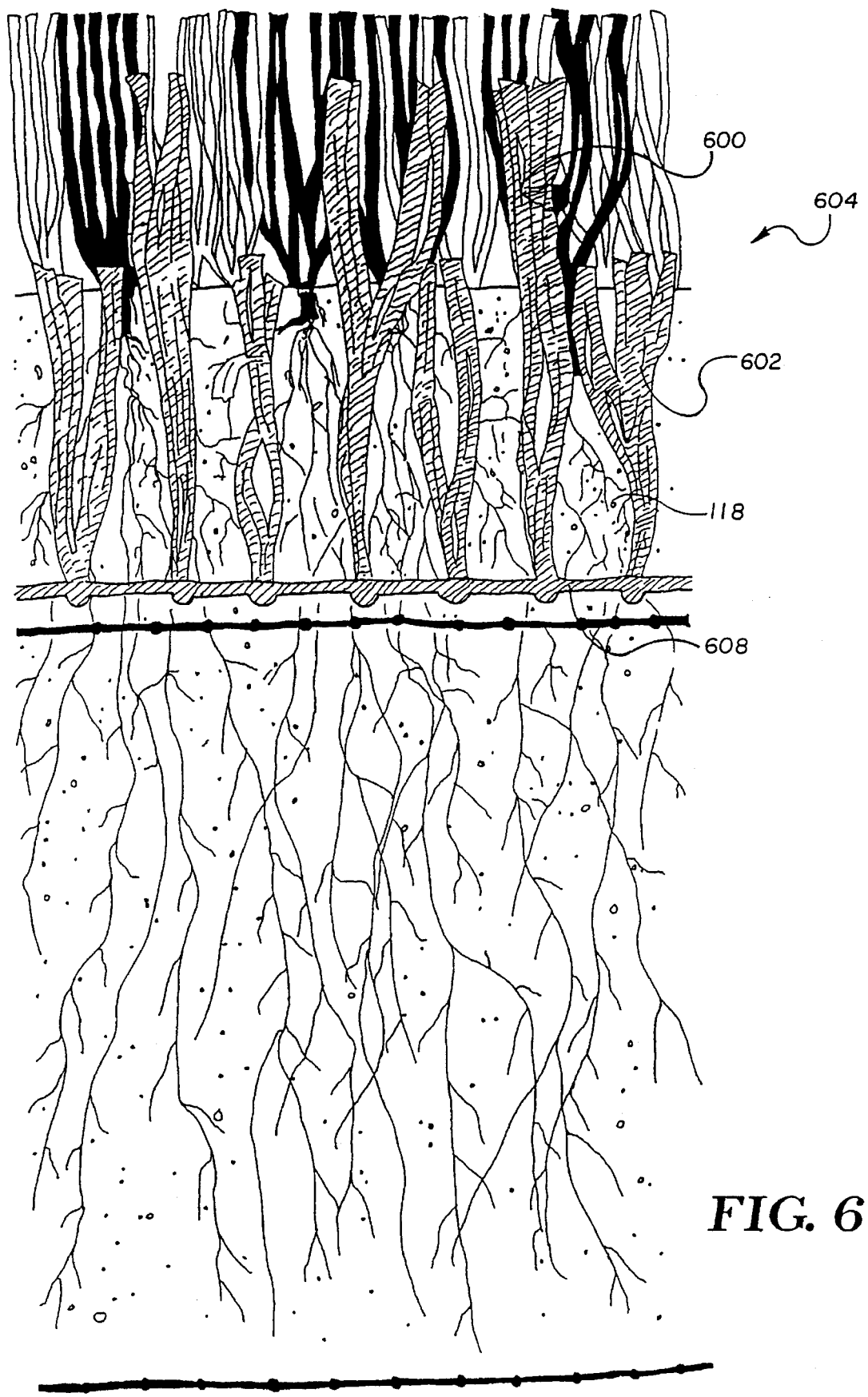
FIG. 6 is an illustration of an imitation grass blade that is preferred for use with the subject invention.

In a particularly notable alternative embodiment, the imitation grass blades 600 and 602 are constructed from imitation grass blades having varying lengths. Referring to FIG. 6, an improved surface 604 is constructed from imitation grass blades 600 and 602 secured to a flexible backing 608. The imitation grass blades 600 and 602 include a first portion 600 of a first length and a second portion 602 of a second length. As illustrated in FIG. 6, the length of the first portion 600 is greater than the length of the second portion 602 so that the imitation grass blades 600 extend outward from the flexible backing 608 a greater distance than the imitation grass blades 602.

The improved surface 604 provides improved characteristics for selected uses. As one example, the improved surface 604 has been shown to be particularly suited for use as the driving portion of a golf tee because the longer imitation grass blades 600 provide greater resistance to golf balls to support the golf balls above the top of the improved surface 604 thereby decreasing the damage to the remainder of the improved surface 604, and because the longer imitation grass blades 600 provide more uniform appearance after being used. As another example, a selected portion of the first portion 600 of imitation grass blades may be provided in a predetermined color for marking lines, logos, etc. Those skilled in the art will appreciate that the imitation grass blades of the subject invention may be constructed from a variety of lengths to provide different characteristics to the improved surface, and that two or more different lengths could be used in the same application.

Those skilled in the art will recognize that the construction of the synthetic turf base 104 may be further varied without departing from the present inventions. As examples: the imitation grass blades 110 may be constructed or attached to the backing so that the imitation grass blades are either "directional" or "nondirectional"; the openings in the imitation grass blades may be created by twisting several strands or fibers of material to provide a "twisted" imitation grass blade; the imitation grass blades can be constructed in a variety of arrangements, e.g., frizzed.

Returning to FIG. 1, the synthetic turf base 104 further includes a surface layer of material 118 positioned atop the flexible backing 112. The surface layer of material 118 preferably fills the synthetic turf base 104 from the flexible backing 112 to a point proximate the top portion 114 of the imitation grass blades 110. After installation, it is sometimes desirable to permit the top portions 114 of the imitation grass blades 110 to extend outward beyond the surface layer of material 118, as will be described in more detail below. To this end, the synthetic turf base 104 may be completely filled with the surface layer of material 118 so that, after settling, the top portions 114 of the imitation grass blades 110 extend outward beyond the surface layer of material 118.

The improved surface 100 further includes natural grass 120 that is planted in the surface layer of material 118. The natural grass 120 includes a multiplicity of grass blades 122 each having a crown 123 and roots 124 associated therewith. The natural grass 120 is planted in the surface layer of material 118 so that the crown 123 is positioned just below the top of the surface layer of material 118, as is known in the art. Preferably, the seed that is planted to grow the natural grass is positioned in the surface layer of material at a point where the crown will be located after the surface is established. Generally, it is desirable to position the crown 123 approximately one quarter of one inch below the top of the surface layer of material. However, those skilled in the art will appreciate that the crown 123 may be positioned at varying distances from the top of the surface layer of material depending upon a variety of factors, e.g., the type of natural grass 120 and the composition of the surface layer of material 118.

Constructed in this manner, the imitation grass blades 110 surround the crowns 123 of the natural grass 120 to provide protection to the crowns 123 which is particularly needed during periods of heavy use and/or poor weather conditions. It will be appreciated by those skilled in the art that in the preferred embodiments of the invention discussed herein, the imitation grass blades 110 provide little protection to the grass blades 122. However, it is the intention of the present invention to protect the crown 123 and roots 124 of the natural grass 120 thereby to minimize the time required for the grass blades 122 to re-grow at times when the improved surface 100 is being re-established and to provide a surface with a smoother, grass-like appearance, which may be used during re-establishment. The presence of the natural grass 120 gives the improved surface 100 the comfort, feel, grip, and appearance of a conventional natural turf surface while the presence of the imitation grass blades 110 protects the crown 123 and roots 124 to protect the improved surface 100 from deterioration, and the resultant high maintenance costs generally associated with a natural turf surface.

Returning to FIGS. 1 and 5, the roots 124 of the natural grass 120 extend downward through the surface layer of material 118, through the blade openings 508 of the imitation grass blades 110, and through the backing openings 116 of the flexible backing 112. Providing blade openings 508 through which the roots 124 extend permits the roots 124 to assist in integrating the natural grass 120 with the surface layer of material 118 and the imitation grass blades 110. Providing backing openings 116 through which the roots 124 can extend permit the roots 124 to assist in integrating the synthetic turf base 104 with the foundation 102. It is desirable, therefore, to provide blade openings 508 and backing openings 116 adequate in size and number to permit the roots 124 to penetrate from the surface layer of material 118 to the sub-base 108.

One method of providing blade openings 508 of adequate size and number is to provide imitation grass blades 500 with a web 506, as discussed above by reference to FIG. 5. After the roots 124 have grown through the blade openings 508 of the imitation grass blades 500 the roots 124 will assist in maintaining the imitation grass blades 500 in position thereby integrating the synthetic turf base 104. Other methods fro providing blade openings of sufficient size and number to permit the roots 124 to integrate the synthetic turf base will readily become apparent to those skilled in the an as will other methods of providing imitation grass blade surfaces that the roots 124 can grip or intertwine with.

One method for providing backing openings 116 of adequate size and number is by providing a biodegradable coating 112 (or secondary backing) (see FIG. 4) so that, after the biodegradable secondary backing has deteriorated, the openings in the primary backing will be of sufficient size and number to permit adequate penetration of the roots 124 from the surface layer of material 118 to the sub-base 108. Those skilled in the an will appreciate that by permitting the roots 124 to penetrate the backing openings 116 of the flexible backing 112, the roots 124 will provide integration of the synthetic turf base 104 to the sub-base 108 beyond any conventional method for fixing the synthetic turf base 104 to the sub-base. The roots 124 will interact with the openings to firmly fix the synthetic turf base 104 to the sub-base, thereby preventing any movement across the sub-base or lifting at the edges.

As mentioned briefly above, the sub-base 108 is constructed to provide structural support to the synthetic turf base 108, as with conventional or sand-filled synthetic turf. Unlike conventional or sad-filled synthetic turf, however, the sub-base 108 is further constructed to provide a growing medium for the roots 124 of the natural grass 120.

The surface layer of material 118 may comprise any of a variety of materials for supporting the natural grass 120. In the presently preferred embodiment of the invention, the surface layer of material 118 is a mixture of sand and rubber particles. However, it will be apparent to those skilled in the art that the surface layer of material may comprise any of a variety of materials for supporting of and as a growing medium for the natural grass 120. Further, it is desirable to provide the surface layer of material 118 in sufficient quantity to assist in stabilizing the synthetic turf base 104 and the imitation grass blades 110. Preferably, the surface layer of material 118 is provided in quantity sufficient to provide approximately five pounds for each square foot of the improved surface 100. However, more or less material may be provided in different applications. Also, it is desired to provide the surface layer of material 118 in sufficient quantity to extend from about one half to one inch from the flexible backing 112, to provide a sufficient growing medium for the roots 124 of the natural grass 120 above the flexible backing 112.

Along these lines, it is to be noted that due to the improved construction of the synthetic turf base 104 in combination with the natural grass 120, the selection of adequate materials for the surface layer of material 118 is not limited as with presently available sand-filled synthetic turf surfaces. As an example, it is generally accepted that only rounded silica sand, a somewhat scarce and expensive sand, is suited for use with sand-filled synthetic turf surfaces. This is because regular sand is abrasive against the users and the imitation grass blades, and tends to compact preventing surface drainage and creating a harder surface that is less comfortable for the user. However, due to the tendency of the roots 124 of the natural grass 120 of the present invention to hold the surface layer of material 118 in place, regular sand may be used in the improved surface 100 without increased abrasion against the imitation grass blades 110. Further, the roots 124 of the natural grass 120 provide some resiliency and movement in the synthetic turf base 104 which reduces compaction. Still further, the grass blades 122 of the natural grass 102 protect the user from abrasion against the surface layer of material 118.

Still further, although it is desirable to mix rubber, or other cushioning particles with the sand, it is generally accepted that rubber particles cannot be mixed with the silica sand (and to some extent also, regular sand) of prior art sand-filled synthetic turf surfaces. This is because water and agitation of the sand will tend to separate the rubber particles from the sand, bringing the rubber particles to the top. However, due to the tendency of the roots 124 of the subject invention to hold the surface layer of material 118 in place, rubber particles may be mixed with the selected surface layer of material 118 to thereby provide a more comfortable playing surface. Also, the addition of rubber particles to the surface layer of material results in less compaction and, therefore, less mechanic aeration of the surface as part of a maintenance program is required.

As noted above, it is sometimes desirable to permit a portion, as described by reference to FIG. 1, of the top portions 114 of the imitation grass blades 110 to extend outward beyond the surface layer of material 118. This provides additional protection to the crown 123, roots 124, and blades 122 of the natural grass 120, thereby improving the durability of the natural grass. Also, the characteristics of the resulting improved surface 100 can be varied by varying the length of the top portions 114 that is to be exposed (see FIG. 6). Further, at times when the grass blades 122 of the natural grass 120 are worn short, exposed portions of the imitation grass blades 110 of the synthetic turf base 104 and 604 will further protect the crown 123, roots 124, and blades 122 from being completely destroyed and will provide a visually pleasing surface. It is important to note, however, that it is not necessary to permit the top portions 114 to extend beyond the surface layer of material to achieve the principal advantages of the subject invention. Conversely, in many applications it will be desirable to minimize the exposure of the top portions 114, e.g., football, where surfaces with natural-like characteristics are desired, where it is not mandatory that the surface appear to have grass, and where exposed top portions 114 could present a hazard to the players. Whether the top portions 114 extend beyond the surface layer of material 118 or not, the crown 123 and roots 124 will be protected by the remaining portions of the imitation grass blades 110. Also, since the root system of the natural grass 120 will not be destroyed, the blades 122 of the natural grass 120 will return without the maintenance required for fully natural surfaces, i.e., replanting will not be required since the established roots 124 and crown 123 will regenerate new blades 122.

Another advantage of the present invention is that the blades 122 of the natural grass 120 shield sunlight from the imitation grass blades 110 of the synthetic turf base 104 substantially reducing the breakdown of the imitation grass blades 110 due to ultraviolet light. Further, the incorporation of the natural grass 120 with the synthetic turf base 104 reduces wear of the synthetic turf base 104 since the roots 124 of the natural grass 120 reduce the grinding action of the sand on the synthetic turf. This reduction in wear and ultraviolet light breakdown increases the expected life of the improved surface 100, thereby reducing the long term cost of the surface.

Figure 2:
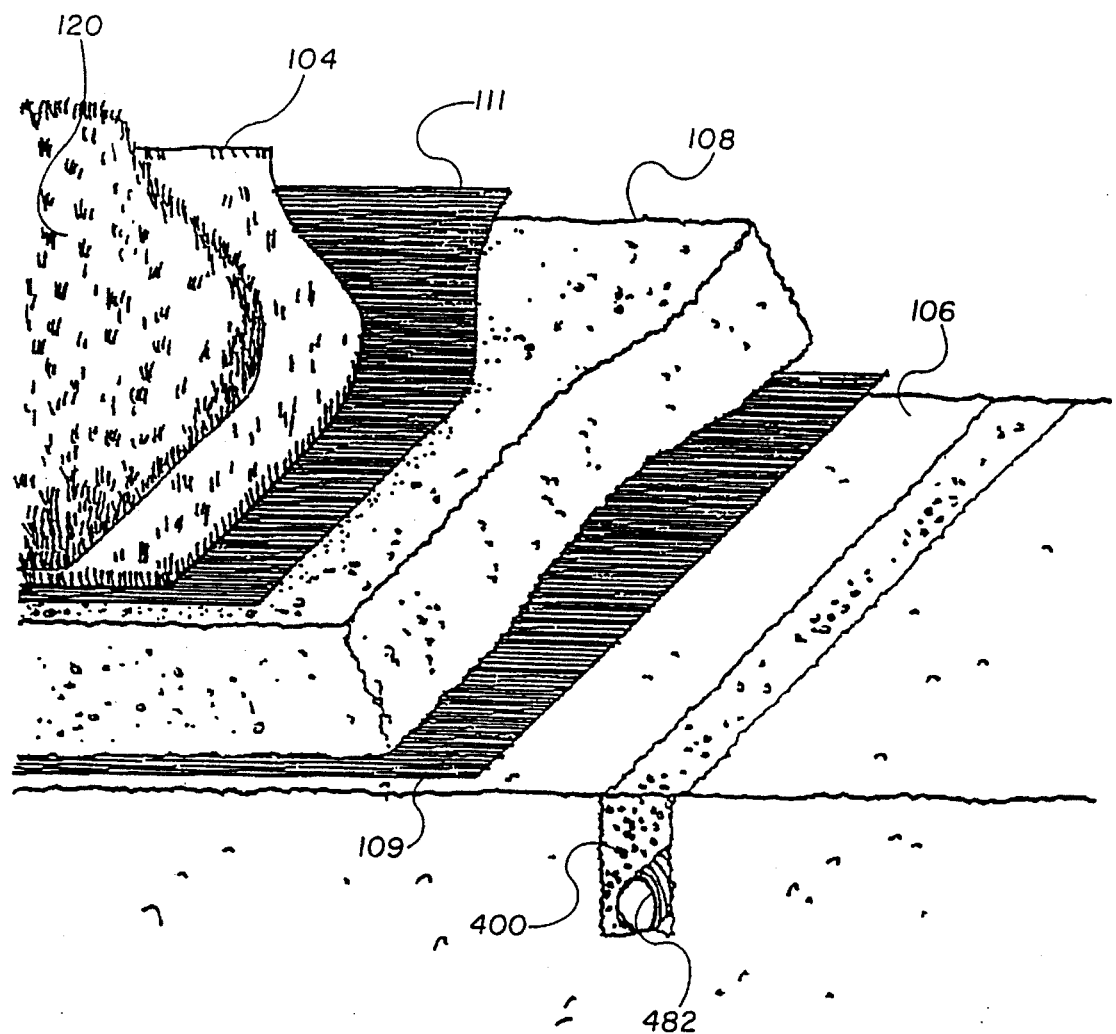
FIG. 2 is a partial cutaway view showing how the improved surface of the subject invention is constructed.

Referring to FIG. 2, a description of the manner of constructing the improved surface 100 illustrated in FIG. 1 will be described. Initially, the subgrade 106 is prepared by adding irrigation piping 400 and trenches with piping 402. Thereafter, the second perforated filter 109 is added atop the subgrade 106, if desired, and is followed by the sub-base 108. If the first perforated filter 111 is desired it is placed upon the sub-base 108 followed by the synthetic turf base 104, including the surface layer of material 118. It should be noted by those skilled in the art that the filters 109 and 111 are optional and one or the other or both may not be required in all cases. After the synthetic turf base 104 has been placed in position, the natural grass 120 is planted so that the crown 123 and roots 124 can form, as described above. Those skilled in the art will appreciate that one significant advantage of the present invention is that, since the crown 123 and root system 124 of the natural grass 120 hold the synthetic turf base 104 in place, no seaming tape, or other type of securing means is needed to hold the synthetic turf base 104 in position.

A particularly useful way of installing the improved surface 100 that is the subject of this invention is by the use of improved seeded panels. In accordance with this method, the synthetic turf base is manufactured in panels of a size readily stored, transported, and installed, e.g., of approximately 16 inches by 48 inches. During manufacturing, the synthetic turf base is filed with a surface layer of material which is seeded to create a seeded panel.

Preferably, the seeded panel is manufactured by combining a binding material with the surface layer of material to stabilize the components of the seeded panel during manufacture, transportation, and installation. Preferably, the binding material is selected as a material that can be readily decomposed after the seeded panels are installed, as will be described in more detail below. A presently preferred binding material that may be used is a biodegradable material. Other binding materials, such as degradable materials may also be used, as will become apparent to those skilled in the art.

The manufacture of the seeded panel may be continued by combining the binding material with the surface layer of material in a variety of ways. As an example, the binding material may be combined with the surface layer of material in a substantially dry form, combined with a sufficient amount of water or other activating agent, and dried to create a substantially cohesive structure. As an alternative, the surface layer of material may be combined with a binding material in a substantially liquid form, and thereafter dried to create a substantially cohesive structure.

In either method, it is desired to initially provide only that amount of surface layer of material that is desired intermediate the seeds and the backing of the synthetic turf base. To complete the manufacture of the seeded panel, the seed may be provided and the process completed to add that additional amount of surface layer of material desired intermediate the seed and the top of the seeded panel. The additional amount of surface layer of material may be stabilized with a binding material, as described above. Thus produced, the seeded panels may be readily stacked and/or otherwise stored, prior to shipping and installation. Those skilled in the art can readily identify favorable storage conditions.

Figure 7A:
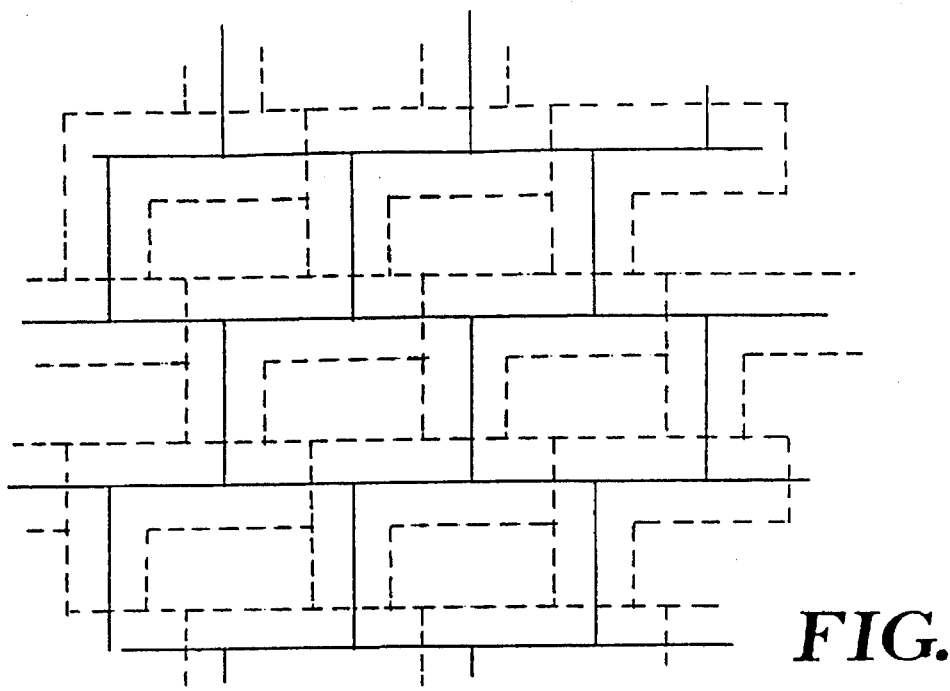
FIG. 7 is an illustration of a seeded panel during installation.
Figure 7B:
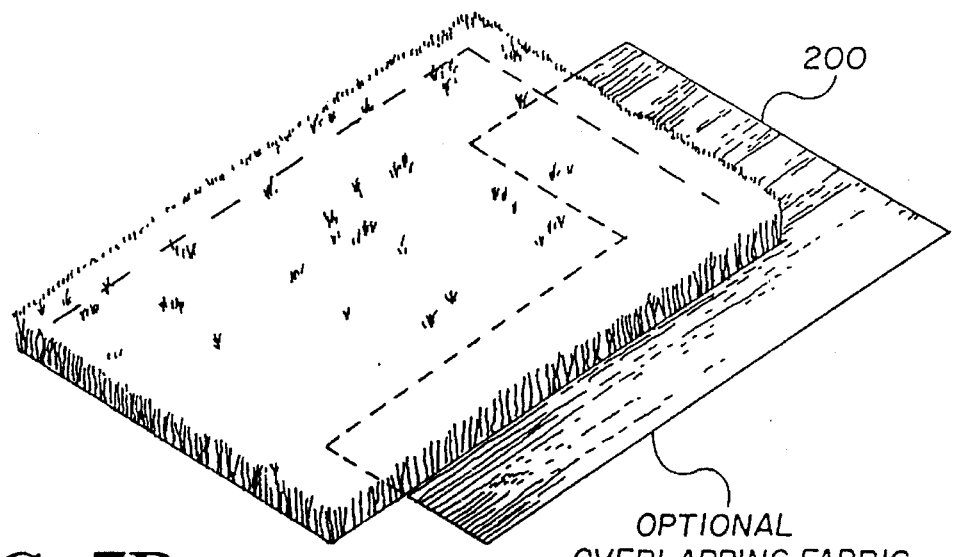

For installation, a foundation is prepared as described above. A mesh-type material 700 is laid upon the foundation intermediate the foundation and the seeded panels, as illustrated in FIG. 7. The mesh-type material is provided so that the roots of the natural grass of adjacent seeded panels may grow through the mesh-type material thereby integrating the panels to form a substantially integral surface. It is important, therefore, that the mesh be positioned at abutting edges of the seeded panels. Accordingly, the mesh-type material may be constructed in an "L" shape as shown in FIG. 7, or a variety of other shapes. Water, with or without a biostimulant, is provided to deteriorate the binding material and to begin germination of the seed.

The seeded panels constructed in this manner may be produced in a controlled production environment thereby assuring a consistently high quality of product with the exact specification of ingredients required for each application. Various steps required to build this surface at the site may be completed in the controlled production environment thereby greatly reducing installation time at the site. Additionally, each panel manufactured can be substantially identical and therefore, the installed surface will not be subject to variation that may exist as a result of variation between local installers, local materials, and weather conditions. Another advantage is that the seeded panels may be installed under most weather conditions. The time for installation is significantly less than that required for installation of the improved surface when constructed without using seeded panels. Considerable cost-saving in the handling and installation of the material is also achieved.

It will be apparent to those skilled in the art that although several presently preferred embodiments of the invention have been described in detail herein, many modifications and variations may be provided without departing from the true scope and spirit of the invention. Accordingly, the invention is not limited except as by the appended claims.

I claim:

1. A grass playing surface comprising:

(a) a foundation;

(b) an artificial grass turf located on top of the foundation, the artificial grass turf having generally vertically upright fibers mounted in a porous backing material;

(c) a layer of growth medium disposed in the artificial grass turf to a depth sufficient to substantially fill the artificial grass turf to the top of the fibers, the top of the fibers terminating at approximately the top of the layer of growth medium; and (d) natural grass plants having grass blades, crowns and roots, the grass plants disposed in the growth medium, the roots extending downwardly through the growth medium, the artificial grass turf, and into the foundation, the crowns being located slightly below the top of the artificial fibers and the grass blades extending upwardly above the top of the fibers forming a playing surface of substantially natural grass.

2. The grass playing surface of claim 1, wherein the backing material is formed at least partially of a biodegradable material.

3. The grass playing surface of claim 1, wherein the fibers are tufted into the backing material.

4. The grass playing surface of claim 1, wherein the fibers include holes extending through the fibers at least partially over the length of the fibers.

5. A durable natural grass playing surface comprising:
   (a) a foundation;
   (b) artificial grass means for protecting crowns and roots of natural grass plants, located on the foundation, the top of the artificial grass means being located approximately coplaner with the surface of the ground, the artificial grass means including artificial grass fibers mounted in a porous bating material and extending generally vertically upwardly from the backing material, and a layer of growth medium disposed in the artificial grass fibers to a depth sufficient to substantially fill the artificial grass fibers to the top of the fibers so that, the tops of the grass fibers terminate approximately at the top of the layer of growth medium; and
   (c) natural grass plants having roots, crowns, and blades, the roots extending downwardly through the artificial grass means and into the foundation, the crowns being located below the top of the artificial grass means and the blades extending upwardly above the top of the artificial grass fibers and the top of the growth medium to fore a playing surface of natural grass blades.

6. The playing surface of claim 5, wherein the porous backing material is at least partially formed of a biodegradable material.

7. The playing surface of claim 5, wherein the fibers are tufted into the backing material.

8. The playing surface of claim 5, wherein the fibers include holes extending through the fibers at least partially over the length of the fibers.

9. The playing surface of claim 5, wherein the artificial grass fibers terminate adjacent the upper surface of the ground.

10. A method of protecting the crown and roots of natural grass plants while maintaining a natural grass playing surface, the method comprising steps of:
    (a) placing an artificial grass turf having generally vertically upright fibers mounted in a porous backing on a foundation;
    (b) filling the artificial grass turf with a growth medium to a depth substantially adjacent to a top of the fibers so that the top of the fibers terminate approximately at the upper surface of the growth medium; and
    (c) sowing grass seed on the top of the filled artificial turf so that the roots of the resulting natural grass plants extend through the growth medium, artificial grass turf, and into the foundation, the crowns of the resulting natural grass plants being located below the top of the fibers, and the blades of the resulting natural grass plants extending upwardly from the tops of the fibers to produce a playing surface formed substantially of natural grass blades.

11. The method of claim 10, further comprising, after the sowing step, the step of strewing a shallow layer of growth medium over the top of the sown grass seed.

12. A pre-seeded panel for forming a durable natural grass playing surface, the pre-seeded panel comprising:
    (a) a layer of artificial turf having generally vertically upright fibers attached to a porous backing material;
    (b) a layer of growth medium dispersed throughout the fibers to a depth sufficient to fill the artificial turf to approximately the top of the fibers, the layer of growth medium being stabilized by a binding material;
    (c) a layer of grass seed strewn over the top of the layer of growth medium; and
    (d) a shallow layer of growth medium strewn over the top of the layer of grass seed to fill the artificial turf to at least the top of the fibers, the shallow layer of growth medium being stabilized by a binding agent.

13. The pre-seeded panel of claim 12, wherein the backing material is at least partially formed of a biodegradable material.

14. The pre-seeded panel of claim 12, wherein the binding agent is biodegradable.

15. The pre-seeded panel of claim 12, wherein the binding agent is water soluble.

16. The pre-seeded panel of claim 12, wherein the fibers include openings to permit roots of natural grass to pass through the fibers.

17. A method for forming a durable, natural grass playing surface, comprising the steps of:
    (a) providing a panel of artificial turf having generally vertically upright fibers attached to a porous backing material;
    (b) placing a layer of growth medium throughout the fibers to a depth sufficient to fill the artificial turf to approximately a top of the fibers;
    (c) stabilizing the layer of growth medium with a binding material;
    (d) strewing a layer of grass seed over the top of the layer of growth medium;
    (e) dispersing a shallow layer of growth medium over the top of the layer of grass seed to fill the artificial turf to at least the top of the fibers;
    (f) stabilizing the shallow layer of growth medium with a binding agent; and
    (g) placing a plurality of panels formed in accordance with steps (a)–(f) adjacent one another on a foundation and watering the panels to produce a natural grass playing surface.

18. The method of claim 17, further comprising placing a plurality of preseeded panels adjacent one another on a foundation and watering the pre-seeded panels to produce a natural grass playing surface.

* * * * *

UNITED STATES PATENT AND TRADEMARK OFFICE
CERTIFICATE OF CORRECTION

PATENT NO. : 5,586,408
DATED : December 24, 1996
INVENTOR(S) : J.G. Bergevin

It is certified that error appears in the above-indentified patent and that said Letters Patent is hereby corrected as shown below:

On the title page, Item

| | | |
|---|---|---|
| [56] Pg. 1, col. 1 | Refs. Cited Foreign Pats. | Add the following reference: --0403008 12/1990 European Pat. Off.-- |
| [56] Pg. 1, col. 1 | Refs. Cited Foreign Pats. Item 4 | "2225240" should read --2225240 A-- |

| Column | Line | |
|---|---|---|
| 11 (Claim 5, | 19 line 8) | "porous bating" should read --porous backing-- |
| 11 (Claim 5, | 32 line 21) | "to fore" should read --to form-- |

Signed and Sealed this

Ninth Day of September, 1997

Attest:

BRUCE LEHMAN

Attesting Officer

Commissioner of Patents and Trademarks

(12) EX PARTE REEXAMINATION CERTIFICATE (6658th)
United States Patent
Bergevin

(10) Number: US 5,586,408 C1
(45) Certificate Issued: Feb. 17, 2009

(54) SURFACE FOR SPORTS AND OTHER USES

(75) Inventor: Jerry G. Bergevin, Lynnwood, WA (US)

(73) Assignee: Turf Stabilization Technologies, Inc., Cincinnati, OH (US)

Reexamination Request:
No. 90/005,510, Oct. 6, 1999

Reexamination Certificate for:
Patent No.: 5,586,408
Issued: Dec. 24, 1996
Appl. No.: 08/334,414
Filed: Nov. 4, 1994

Certificate of Correction issued Sep. 9, 1997.

Related U.S. Application Data

(63) Continuation of application No. 08/078,624, filed on Jun. 17, 1993, now abandoned, which is a continuation-in-part of application No. 07/902,147, filed on Jun. 22, 1992, now abandoned.

(51) Int. Cl.
*A01G 1/00* (2006.01)
*A01H 5/00* (2006.01)

(52) U.S. Cl. .................... 47/1.01 R; 47/56; 47/58.1 R
(58) Field of Classification Search ............... 47/1.01 R, 47/56, 58; 161/21; 273/29; 428/17; 272/3
See application file for complete search history.

(56) References Cited

U.S. PATENT DOCUMENTS 3,545,130 A * 12/1970 Strother et al. ............... 47/58.1
4,268,551 A * 5/1981 Moore, Jr. .................... 428/17
4,396,653 A * 8/1983 Tomarin ....................... 428/17
4,916,855 A * 4/1990 Halliday et al. ................ 47/58

OTHER PUBLICATIONS

Notts Sport, *Grass Reinforcement VHAF*, pages from website.
Notts Sport, *Landscape VHAF Erosion Control Fabrics*, double-sided, single-page brochure, 1988.
Notts Sport, *Heavily Worn Golf Courses Cry Out For Repairs*, single page brochure, 1988.
Notts Sport, *VHAF Winter Games Pitches—Erosion Control Fabrics*, double-sided, single-page brochure, 1988.
Notts Sports, *Golf Courses—VHAF Erosion Control Fabrics*, double-sided, single-page brochure, 1988.
Notts Sports, *Grass Reinforcement VHAF Installation Instructions*, 1990.

* cited by examiner

Primary Examiner—Jeffrey L. Gellner

(57) ABSTRACT

An improved surface includes a synthetic turf base positioned atop a foundation. The synthetic turf base includes imitation grass blades secured to a backing. The synthetic turf base also includes a surface layer of material supported by the backing and intermixed with the imitation grass blades. Natural grass is planted in the surface layer of material wherein the natural grass includes natural grass blades and roots. The backing is provided with perforations or openings sufficient in number to permit the roots of the natural grass to extend through the backing into the sub-base of the foundation. The natural grass improves the overall desirability of the surface by improving its durability, increasing its life span, reducing the cost of installation, reducing the cost of maintenance, improving comfort for users, and improving the benefits of the ecology.

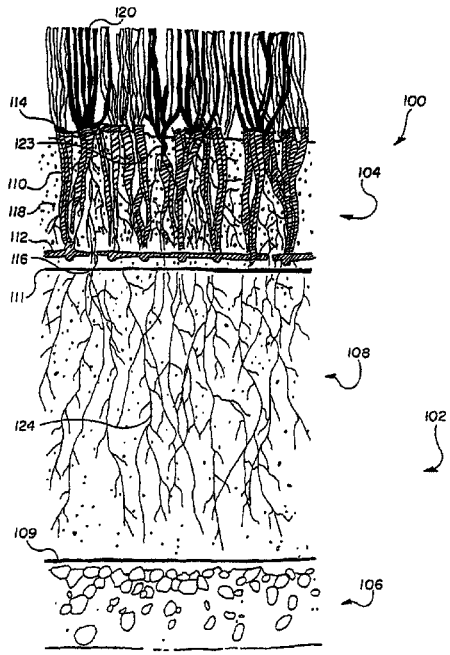

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–18 are cancelled.

* * * * *